United States Patent
Rapp et al.

(10) Patent No.: US 9,544,055 B2
(45) Date of Patent: Jan. 10, 2017

(54) OPTICAL NETWORK ELEMENT

(75) Inventors: Lutz Rapp, Deisenhofen (DE); Torsten Wuth, Holzkirchen (DE)

(73) Assignee: Xieon Networks S.a.r.l., Luxembourg (LU)

(*) Notice: Subject to any disclaimer, the term of this patent is extended or adjusted under 35 U.S.C. 154(b) by 0 days.

(21) Appl. No.: 14/410,244

(22) PCT Filed: Sep. 14, 2012

(86) PCT No.: PCT/EP2012/068030
§ 371 (c)(1),
(2), (4) Date: Jan. 30, 2015

(87) PCT Pub. No.: WO2014/040629
PCT Pub. Date: Mar. 20, 2014

(65) Prior Publication Data
US 2015/0207564 A1 Jul. 23, 2015

(51) Int. Cl.
*H04B 10/00* (2013.01)
*H04B 10/2507* (2013.01)
*H04B 10/61* (2013.01)
*H04J 14/00* (2006.01)

(52) U.S. Cl.
CPC ........ *H04B 10/2507* (2013.01); *H04B 10/616* (2013.01)

(58) Field of Classification Search
CPC ..... H04B 10/03; H04B 10/038; H04B 10/032; H04B 10/616; H04B 10/6161; H04B 10/6162; H04B 10/6971; H04J 14/0287; H04J 14/0294; H04J 14/0289; H04J 14/029; H04J 14/0291; H04J 14/0293; H04J 14/0295; H04J 14/0297
See application file for complete search history.

(56) References Cited

U.S. PATENT DOCUMENTS

| | | | |
|---|---|---|---|
| 2006/0088318 A1 | 4/2006 | Bohn et al. | |
| 2006/0230180 A1* | 10/2006 | Charlet | H04B 10/25133 709/238 |
| 2008/0031633 A1* | 2/2008 | Hoshida | H04B 10/677 398/149 |
| 2012/0128377 A1 | 5/2012 | Hatae et al. | |

FOREIGN PATENT DOCUMENTS

| | | |
|---|---|---|
| EP | 2348651 A1 | 7/2011 |
| WO | 03/077449 A1 | 9/2003 |
| WO | 2014/040629 A1 | 3/2014 |

OTHER PUBLICATIONS

Saradhi, Chava Vijaya et al., "Physical Layer Impairment Aware Routing (PLIAR) in WDM Optical Networks: Issues and Challenges," IEEE Communications Surveys & Tutorials, vol. 11(4):109-130 (2009).
International Search Report and Written Opinion for Application No. PCT/EP2012/068030, 10 pages, dated Jun. 6, 2013.

* cited by examiner

*Primary Examiner* — Daniel Dobson
(74) *Attorney, Agent, or Firm* — Nelson Mullins Riley & Scarborough LLP

(57) ABSTRACT

A method for operating an optical network element is provided, wherein based on a quality parameter a subsequent set of parameters is selected to operate the optical network element. Also, an according optical network element and a communication system comprising at least one such optical network element are suggested.

11 Claims, 8 Drawing Sheets

OPTICAL NETWORK ELEMENT

CROSS REFERENCE TO RELATED APPLICATIONS

This application is a U.S. National Phase Application under 35 U.S.C. §371 of International Application No. PCT/EP2012/068030, filed on Sep. 14, 2012, which is incorporated herein by reference in its entirety.

The invention relates to a method for operating an optical network element and to an according optical network element.

In the past, optical receivers have been based on direct detection, which requires sophisticated dispersion maps with inline dispersion compensation in order to obtain a reasonable performance. With higher data rates and the availability of new production capabilities, coherent detection has attracted attention and is used in new receiver setups. Such receivers provide maximum performance if there is no inline dispersion compensation. Currently, dispersion is compensated within the electrical domain by appropriate filtering or equalization structures. Parameter settings of these receivers are either determined during the turn-up procedure or communicated via a planning tool.

High reliability of the network is a significant requirement. Hence, some kind of protection mechanism has to be installed, such as line protection, protection of the optical multiplex section or channel protection. In case of a sudden failure of one path, an automatic switching mechanism causes a shift of the data transmission to another path. Such switching has to be very fast, too fast for any additional communication via a management system.

FIG. 1 shows a high level block diagram of the setup of a known coherent transponder. An optical signal 101 is converted by an optical part 102 into the electrical domain. Next, equalization by a frequency domain equalizer (FDE) 103 and clock recovery 104 are performed.

Two blocks contribute to dispersion compensation: The FDE 103 restores the waveform so that clock recovery is possible. This FDE 103 is adjusted by running a scan procedure during system start-up. A time domain equalizer (TDE) 105 is responsible for fine tuning and is embedded into a continuously running control loop, i.e. a signal analysis 106 that provides feedback 107 to the TDE 105.

It is noted that the blocks clock recovery 104, time domain equalizer 105, and signal analysis 106 can be replaced by different blocks providing the output signal. As an example, a forward error correction (FEC) based on a soft decision can be provided.

The procedure can be summarized as follows:
(1) The FDE 103 scans through the available dispersion compensation range and determines an optimum setting. For determining the optimum setting, a quality parameter has to be used for assessment purposes. A possible solution is to use a bit error rate (BER) finally determined. However, in this case the TDE 105 has to reach the steady-state condition for each setting of the FDE 103, which slows down the whole procedure. Other setups use a parameter such as the peak-to-average ratio that can be determined directly after the FDE 103. If the signals after the FDE 103 are not directly accessible, a loss of frame (LOF) signal can be used.
(2) Once the system turn-up has been finished, the system enters the "running mode" and the setting of the FDE 103 is frozen, whereas the control loop of the TDE 105 is running continuously.

It is noted that clock recovery and all subsequent steps can be performed if the waveform after the FDE 103 allows for clock recovery and signal detection. Coarse adjustment of the FDE 103 is sufficient as long as the residual dispersion after the FDE 103 does not exceed a threshold that depends on the data rate.

Filter parameters depend on the transmission path that is currently used, e.g. on the residual dispersion. FIG. 2 shows an exemplary protection setup that embeds a receiver 201.

The receiver 201 corresponds to the coherent transponder shown in FIG. 1. In addition, two transmission fibers 202 and 203 are connected to a protection card 204, which allows selecting one of the fibers 202 or 203 via a switch 205.

The two fibers 202 and 203 represent disjoint paths. It might even be that different types of fibers are used having different dispersion values. In this case, protection cannot work, because the FDE setting that has been optimized for the working path is not suitable for the protection path.

Hence, current solutions bear the problem that in case the transmission characteristics of an optical path changes significantly, i.e. caused by protection switching, the parameter settings of involved compensation filters and/or equalizers cannot be adjusted quickly enough to avoid data loss.

The problem to be solved is to overcome the disadvantages stated above and in particular to provide an efficient solution for an optical network element to quickly adjust in case of protection switching.

This problem is solved according to the features of the independent claims. Further embodiments result from the depending claims.

In order to overcome this problem, a method for operating an optical network element is suggested,
 wherein based on a quality parameter a subsequent set of parameters is selected to operate the optical network element.

The optical network element can be any element of an optical network, e.g., a receiver, a transponder, a line card, a muxponder, etc. The optical network element can be also part of or deployed with another component.

Advantageously, the solution presented allows for a fast adjustment of the parameters for operating the optical network element and thus avoids loss of a connection. In particular, switching between optical paths can be detected via said quality parameter (based on a deterioration of the quality a switching between paths is assumed) and a different set of parameters is selected. The set of parameters can be used for at least one equalizer of the optical network element.

Hence, no information from the switch is required to detect the activation of the protection mechanism. Thus, this solution is advantageously compatible with open platform concepts and provides a maximum flexibility with respect to a placement of cards within a rack or a subrack.

In an embodiment, the quality parameter comprises at least one of the following:
 a quality information with regard to an incoming signal received at the network element or detected after the FDE (e.g., after a first processing step);
 a peak-to-average ratio of a signal received at the optical network element;
 a statistics of samples received at the optical network element, e.g., collected by means of asynchronous or synchronous sampling;
 a quality information with regard to a so-called "eye" of a signal, such as the eye opening of the eye closure penalty.

Any quality parameter can be used which allows for a fast characterization of the quality of an incoming signal enabling a fast reaction to changes of the quality, in particular based on switching between transmission fibers.

The quality parameter can show a positive or negative correlation with the quality of the signal. For example, the peak-to-average ratio is negatively correlated with the quality of the signal, i.e. better quality is indicated by smaller values of the quality parameter and worse quality comes along with larger values of the parameter. In contrast, the eye opening is positively correlated with the signal quality, which means that larger values indicate a better quality.

The quality parameter can also be related to the quality of the transmission path, which can be determined by comparing the characteristics of the signal before and after transmission. All variants to define the quality of a signal or a transmission path are summarized or covered by the term "quality of a connection".

In another embodiment, the set of parameters comprises at least one parameter used for at least one equalizer of the optical network element, in particular for operating a frequency domain equalizer and/or a time domain equalizer of the optical network element.

In a further embodiment, at least one set of parameters is determined during a start-up of the optical network element.

In a next embodiment,
(a) the optical network element is connected to a first transmission fiber,
(b) the set of parameters is optimized or adjusted based for the first transmission fiber;
(c) the set of parameters is stored for the first transmission fiber;
(d) the steps (a) to (c) are repeated for an additional transmission fiber as long as such additional transmission fiber is available.

The transmission fiber is also referred to as path or transmission path (in association with the selected physical fiber).

Hence, a start-up phase can be used to train the different sets of parameters dependent on the various transmission fibers (paths) selected, i.e. for each optical fiber a set of parameters can be determined and stored.

It is also an embodiment that
(e) a quality of a connection is determined via the quality parameter,
(f) a subsequent set of parameters is selected if the quality of the connection is worse than a predetermined threshold,
(g) the steps (e) to (f) are repeated in particular until the quality of the connection reaches at least the predetermined threshold and/or until no further set of parameters is available.

It is noted that the predetermined threshold could be used to decide whether the quality of the connection is bad enough to select a different set of parameters to operate the at least one equalizer of the optical network element.

Pursuant to another embodiment, an information regarding the parameter set to be selected is provided by an additional entity, in particular a management system.

Hence, as an option, the management system (or another card of the actual or of another optical network element) may, e.g., for consistency purposes, provide information about the parameter set, in particular indicate which parameter set to choose for the currently selected transmission fiber. As selecting the set of parameters can be done fast without losing the actual connection, such information may be used for selecting a different set of parameters.

In particular, the approach can be favorably combined with communication from the management system in order to obtain an optimized or optimum performance over the lifetime of the network element. When the switching occurs, a parameter set providing sufficient recovery of the received signals has to be provided to the equalizer (which may also be or comprise a filter) within a short period of time in order to avoid traffic interruption. Thus, advantageously, one out of several parameter sets is selected, whereas the selected parameter set provides sufficient performance. However, this primarily selected parameter set might not provide the best tolerance against further variations or degradation of the links/paths that might for example arise from aging. This drawback can be overcome by selecting a better (or the optimum) parameter set taking into account additional requirements such as tolerance towards parameter variations based on the information provided by the management system. The timing requirement for this readjustment is relaxed and may cope with a slower communication.

The problem stated above is also solved by an optical network element comprising a processing unit that is arranged such that based on a quality parameter a subsequent set of parameters is selected to operate the optical network element.

According to an embodiment, said optical network element comprises at least one equalizer, wherein the set of parameters is used to operate the at least one equalizer.

Pursuant to an embodiment, said at least one equalizer comprises a frequency domain equalizer and/or a time domain equalizer.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device, in particular optical network element, as described herein.

Figure 1:
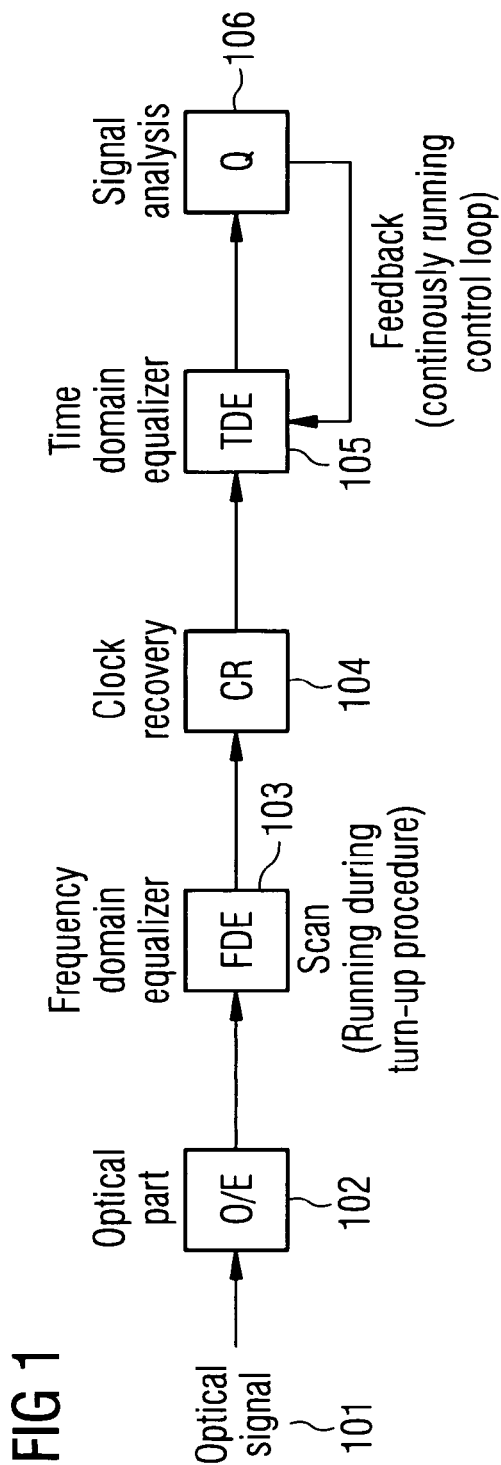
FIG. 1 shows a high level block diagram of a conventional coherent transponder.
Figure 2:
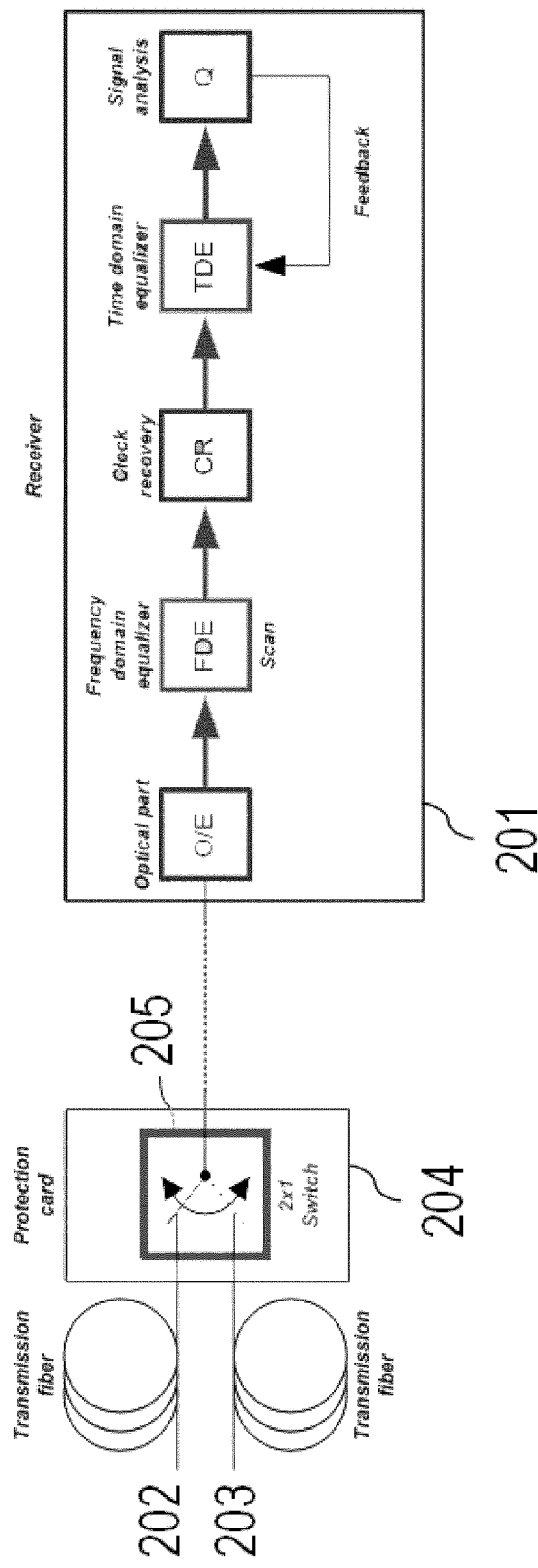
FIG. 2 shows an exemplary conventional protection setup.

The solution presented herein refers to electrical compensation of signal distortions in optical communication system using coherent receivers. In particular, a solution is presented that allows fast protection switching without requiring any fast communication between various cards of a communication system. In other words, the receiver card is able to detect switching activities without any information from outside of the card and is also able to adapt to the new situation in a very short period of time.

The procedure or a setup according to the invention involves the following features:

(a) Saving parameter sets suitable for different positions of a switch, e.g., for different transmission fibers, in a memory;
(b) Using a quality parameter that can be determined fast and that allows for fast detection of switching between optical paths;
(c) Applying a new parameter set to the involved equalizer (s) in case switching to another optical path is detected;
(d) As an option, communication between protection card and receivers can be provided for a consistency check in case a switching between optical paths has occurred.

Hereinafter, some exemplary details with regard to the above-mentioned features are described:

(a) Determining suitable parameter sets:
During system start-up, the protection switch can be set to the different positions and for each position a parameter set can be determined. This parameter set may be optimal or favorable for the selected transmission fiber. The parameter sets could also be provided by a planning tool. The parameter sets can be saved in and thus supplied via a memory.

(b) Quality parameter:
Advantageously, the receiver card is able to detect changes of the transmission path without further information provided by any other card. Therefore, a quality parameter is suggested that can be calculated, e.g., continuously and almost instantaneously. For example, a peak-to-average ratio could be used.

(c) Reaction to switching activities:
Changes of the values of the quality parameter indicate that the properties of the optical path have changed. Thus, each receiver can switch to a subsequent parameter set in the memory and checks if the quality parameter is within the expected range. In the affirmative, no further activities are required. If the quality parameter is still not within the expected range, the receiver switches to the next parameter set. Such switching can be repeated until an acceptable performance is achieved. If no parameter set is suitable, a warning can be issued.

(d) Synchronization of cards:
It could happen that the receiver does not use the correct parameter set although the quality parameter is within the allowed range. This may not be a problem for an actual situation, but it may lead to problems during the lifetime of the product (e.g., if there is no switching activity within the next years). Therefore, a consistency check could be conducted.

Such a situation may arise when more than two parameter sets are available and at least two sets provide sufficient signal quality after the FDE. When choosing the first suitable set, the signals can be received correctly directly after the switching. However, it might be that this parameter set has been determined for a different path and some additional requirements are not adequately considered. For example, a tolerance towards variations induced by aging may be too small so that a problem arises over the next years if no switching operation occurs.

(e) Additional communication for planned switching operations:
Unpredictable switching operations are a critical scenario in optical networks. However, switching operations can be planned due to network reconfiguration or maintenance. In this case, the management system may in addition communicate the correct parameter set to be used when the next switching happens.

It is noted that this approach can also be combined with a continuously operating closed loop control.

For the setup, the following approach could be realized:
(1) The receiver saves two (or more) settings (parameter sets) of the FDE for different optical paths. The setting parameters might even be determined during start-up for all possible switch positions or available protection paths or they might be communicated by a planning tool. As an alternative, the parameter sets may also be provided by the management system or a different networks element.
(2) If the receiver detects a degradation of the quality parameter that exceeds a predefined threshold, it switches to the next parameter set stored for the FDE.

Since there is no scan required after switching, the solution presented is very fast and avoids loss of a connection. Furthermore, no information from the switch is required to detect the activation of the protection mechanism. Thus, this solution is compatible with open platform concepts.

It is further noted that merely communicating the switch position via a management system may be too slow. Each card, i.e. the protection card and the receiver card has to detect the failure of the current transmission path on their own. However, after the switching described herein is conducted, additional synchronization via the management system of the local communication network can be done in order to detect and resolve inconsistencies, but are not mandatory for operation of the receiver after another transmission fiber has been selected.

Figure 3:
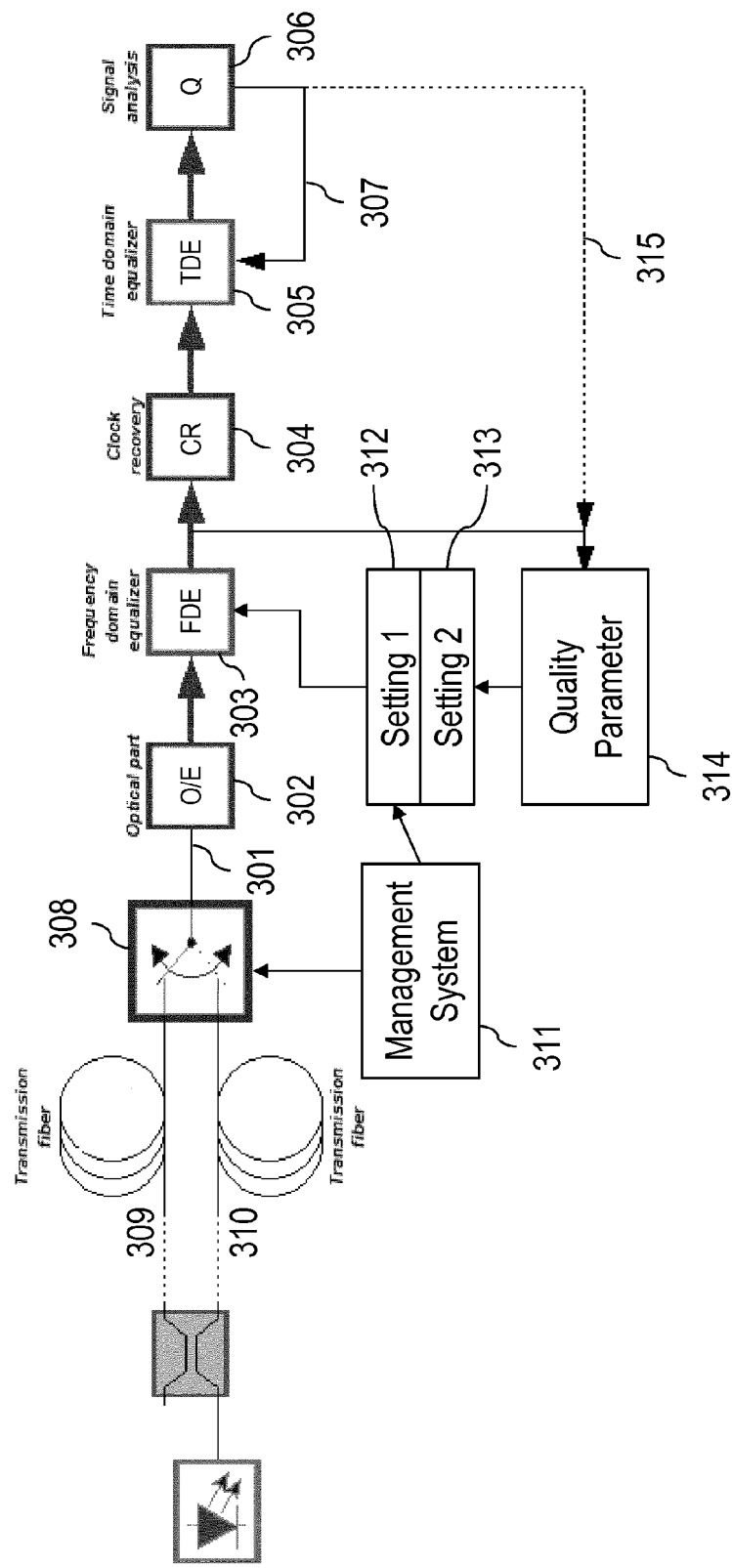
FIG. 3 shows an exemplary diagram, also including a start-up procedure of a transponder.

FIG. 3 shows an exemplary diagram also including a start-up procedure of a transponder.

An optical signal 301 is converted by an optical-to-electrical part 302 into the electrical domain. Next, equalization by a frequency domain equalizer (FDE) 303 and clock recovery 304 are performed. The output of the clock recovery 304 is fed to a time domain equalizer (TDE) 305, which is responsible for fine tuning and is embedded into a continuously running control loop, i.e. a signal analysis 306 that provides feedback 307 to the TDE 305.

Two transmission fibers 309 and 310 are connected to a protection card, which allows selecting of the fibers 309 or 310 via a switch 308.

A management system 311 defines the position of the switch 308. After determining the optimum settings for the FDE 303, the parameter set 312 is saved in the corresponding memory. Next, the switch 308 is set to the alternative switch position and a favorable or optimal parameter set 313 is determined and stored in the memory as well. Hence, both settings 312 and 313 are stored in the memory and can be selected based on the value of a quality parameter 314 during operation of the transponder—indicated by line 315.

For example, some parameter sets can be determined according to the above described procedure, whereas others can be communicated via a management system, a planning tool, or an operator.

It is noted that the functionality of the FDE 303 could also be provided by the TDE 305. In particular, both, the FDE 303 and the TDE 305 can be combined as a single component.

Figure 4:
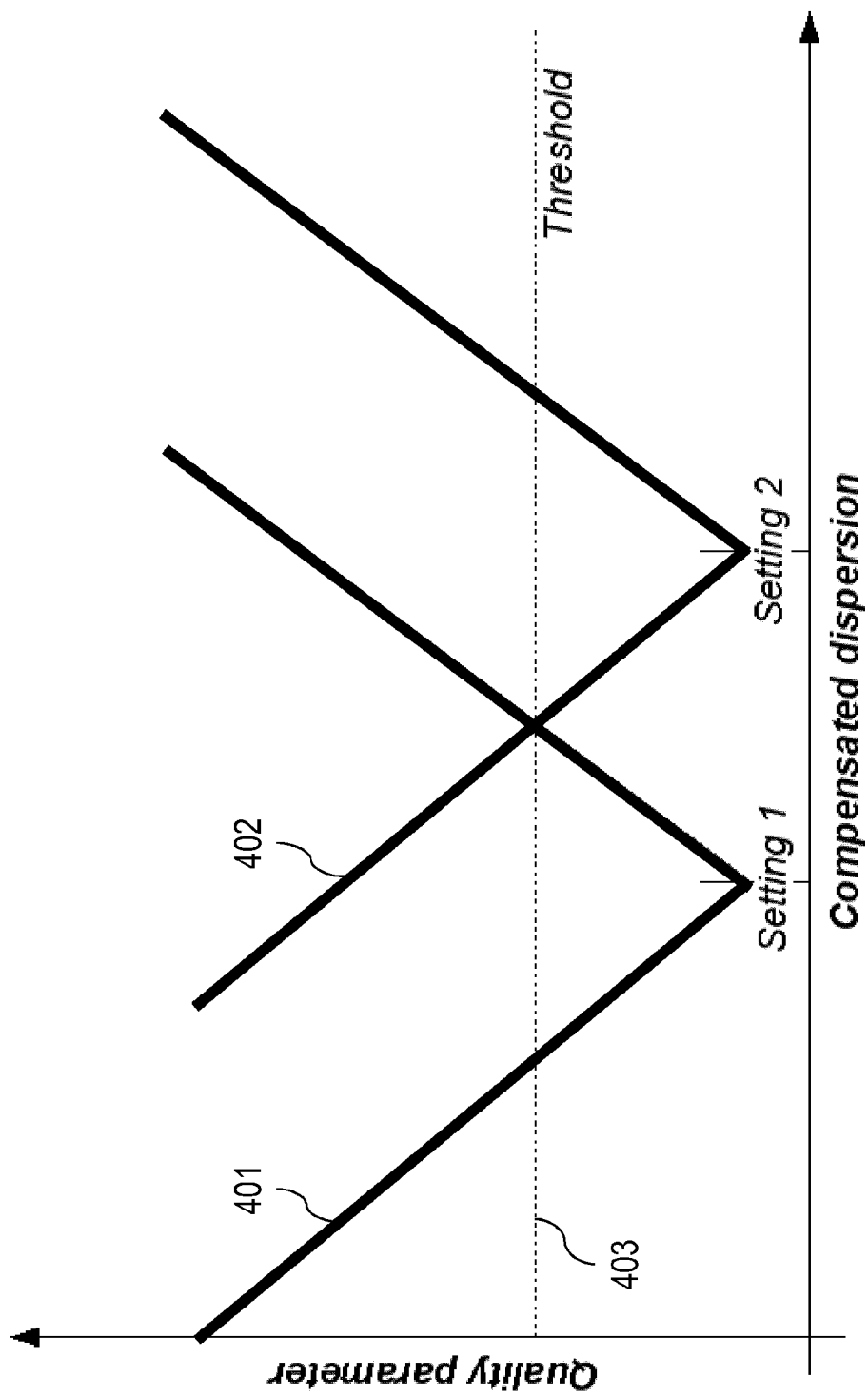
FIG. 4 shows a schematic diagram visualizing a dependency of the quality parameter in view of the compensated dispersion for two switch positions, wherein the quality parameter has a negative correlation with the quality of the signal, i.e. smaller parameter values indicate better signal quality.

FIG. 4 shows a schematic diagram visualizing a dependency of the quality parameter in view of the compensated dispersion for both switch positions 401 (setting 312) and 402 (setting 313). Optimal settings can be determined for both switch positions 401 and 402. It is also possible to determine a threshold 403. The threshold 403 can be determined by applying various rules.

It is assumed that the switch 308 is in its first position, connecting the transmission fiber 309 and the settings 312 are applied to the FDE 303. Next, it is assumed that the quality parameter reaches a high value indicating, e.g., a failure of the first transmission fiber 309 or that no signal is detected anymore. The switch 308 may now autonomously select the second position connecting the transmission fiber 310, which has a different characteristic compared to the transmission fiber 309. Hence, the quality parameter further deteriorates. The receiver now utilizes the setting 313 based on the fact that the quality of the transmission has deteriorated; in other words, the receiver tries a different parameter set and hopes that the quality parameter improves quickly. If the reason for the deterioration is based on the switching to the other transmission fiber, such switching to the second parameter set (in this example there are only two transmission fibers and two parameter sets) quickly improves the value of the quality parameter, because the second parameter set has been determined to be suitable for the other transmission fiber during start-up. Hence, the second parameter set is used to operate the FDE 303 and an optimal or significantly improved performance can be achieved in short time after the switch 308 selected the other transmission fiber.

Figure 7:
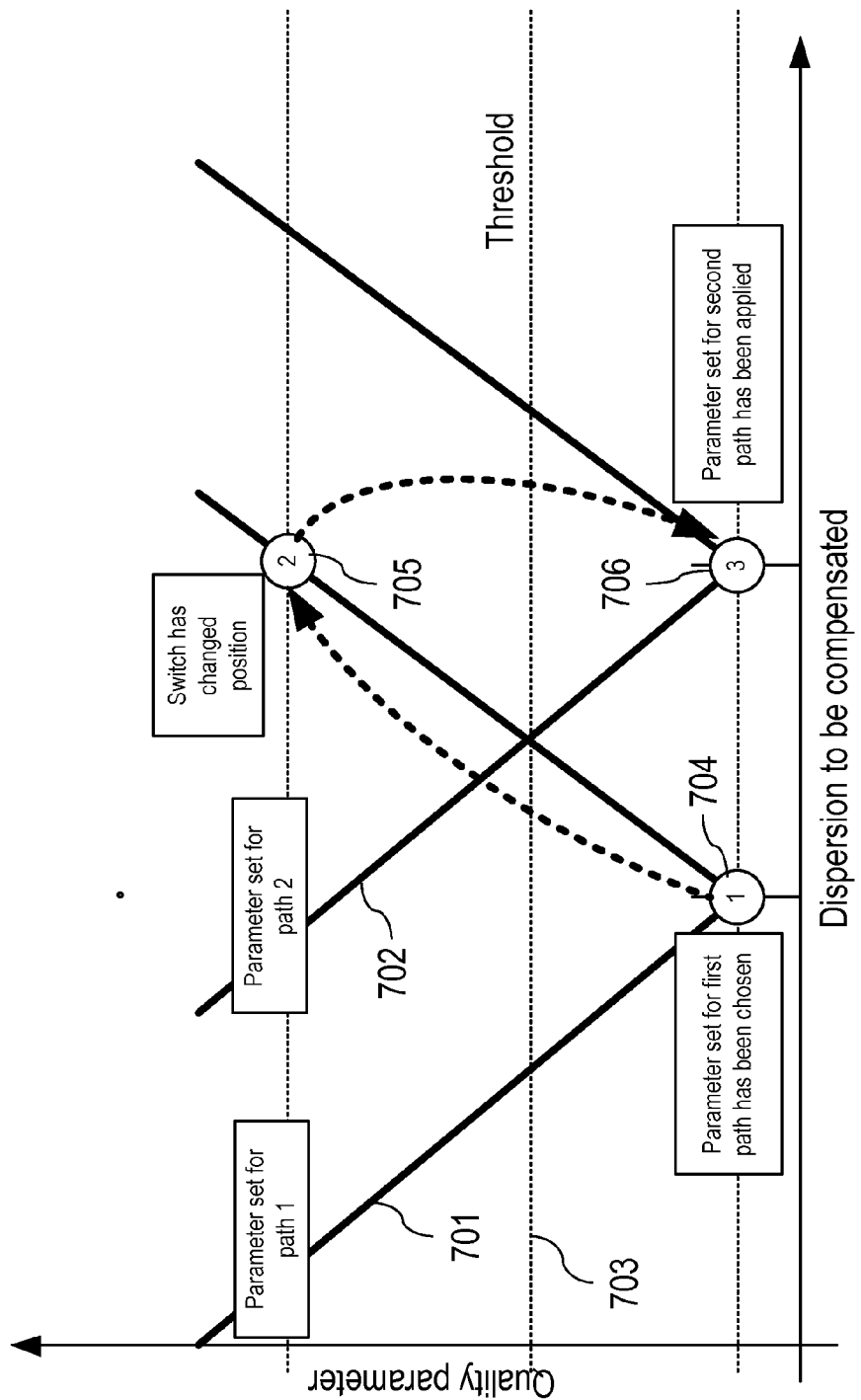
FIG. 7 shows a schematic diagram visualizing a dependency of the quality parameter in view of the dispersion to be compensated for a parameter set used for a first transmission fiber and a parameter set used for a second transmission fiber, wherein the quality parameter has a negative correlation with the quality of the signal, i.e. smaller parameter values indicate better signal quality.

FIG. 7 shows a schematic diagram visualizing a dependency of the quality parameter in view of the dispersion to be compensated for a parameter set 701 used for a first transmission fiber and a parameter set 702 used for a second transmission fiber (the transmission fiber is also referred to as path). In addition, a threshold 703 is depicted.

At a point 704, a parameter set for the first path has been chosen, at a point 705 the second transmission fiber (path) is selected by the switch. As the quality parameter at this point 705 is beyond the acceptable threshold (in this example all below the threshold 703 is deemed acceptable), the second parameter set is selected (see point 706), which again brings back the quality of the received signal on an acceptable level.

Figure 8:
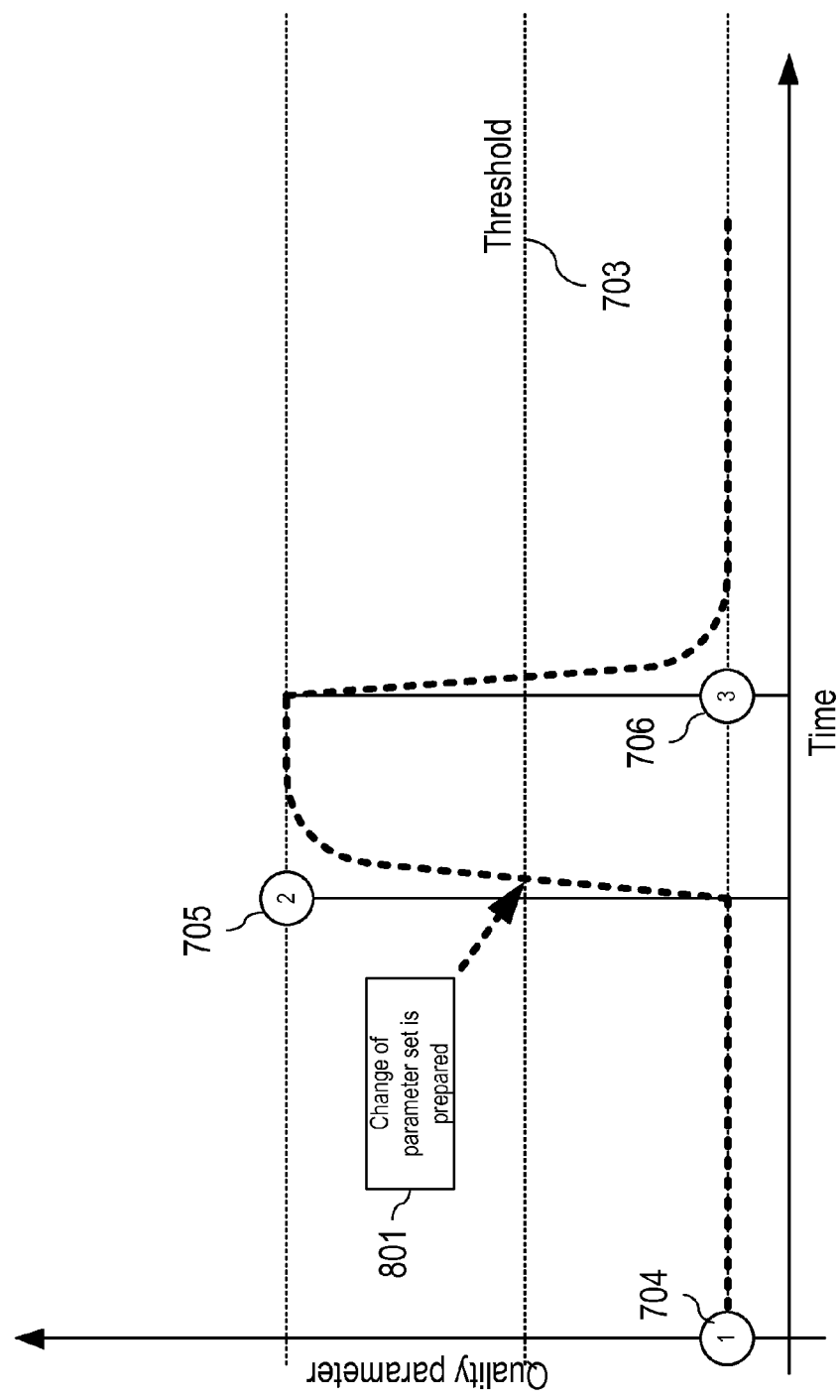
FIG. 8 shows the transitions indicated in FIG. 7 over time.

FIG. 8 shows the transitions between points 704 to 706 over time. At a point 801 the quality parameter deteriorates beyond the threshold 703, which triggers a change of the parameter set (which is executed at point 706).

In case applying the setting 313 does not lead to a sufficient value of quality, a new scan can be initiated.

As quality parameter, a peak-to-average ratio can be used; in addition, any variance measurement instead of said peak can be used, e.g., a statistical measurement.

Figure 5:
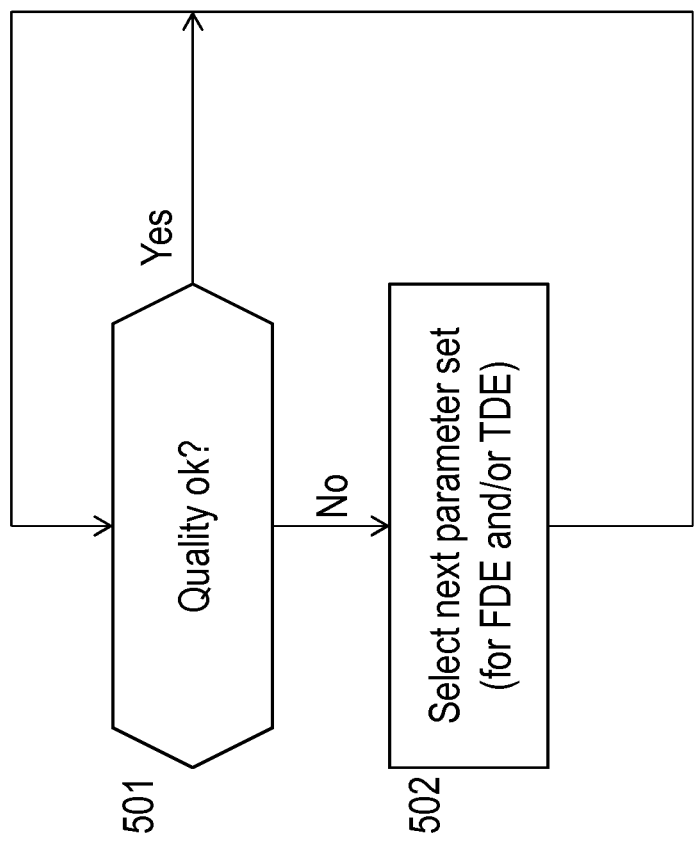
FIG. 5 shows a schematic flow diagram visualizing steps for a receiver to cope with switching between transmission fibers in a fast manner.

FIG. 5 shows a schematic flow diagram visualizing steps for a receiver to cope with switching between transmission fibers in a fast manner. In a step 501 a quality parameter is assessed. If it is within a predetermined range, the assessment may continue (i.e., continuously or in an iterative way by checking the quality parameter, e.g., at a regular time interval). If the value of the quality parameter is not as it should be, a next parameter set is selected (e.g., from the memory where it was previously stored) and applied to drive the at least one equalizer, in particular the FDE and the TDE, of the optical element. Next, it may be continued with step 501.

Figure 6:
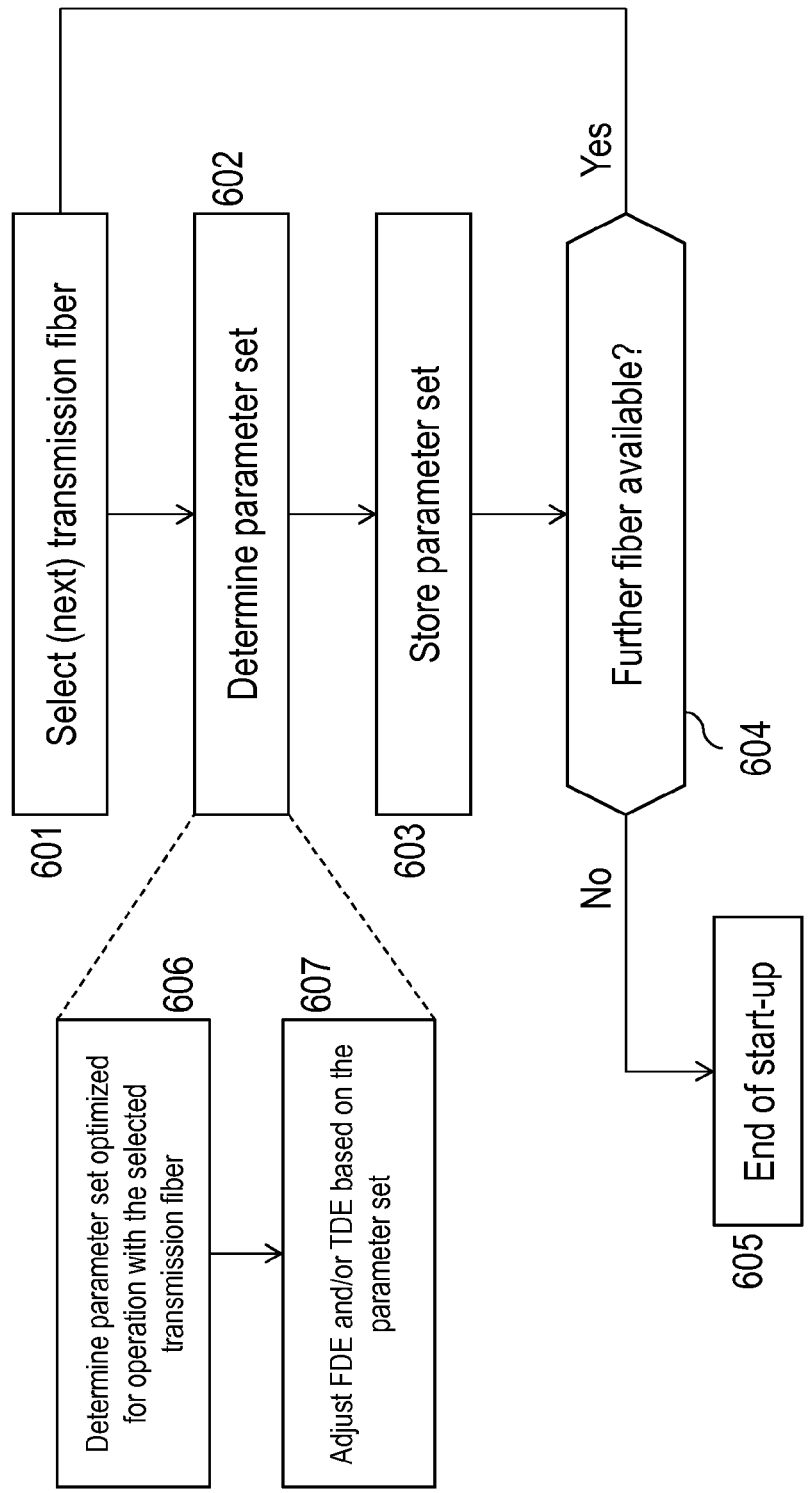
FIG. 6 shows a flow diagram schematically visualizing a start-up phase of the optical network element.

FIG. 6 shows a flow diagram schematically visualizing a start-up phase of the optical network element. In a step 601, a (first) transmission fiber is selected. A parameter set for this transmission fiber is determined in a step 602. In particular the parameter set may be optimized for operation with the selected transmission fiber (step 606) and such parameter set may be used to adjust the at least one equalizer of the optical network element, in particular the FDE and/or the TDE (step 607). In a step 603, the parameter set is stored in a memory. In a step 604 it is checked whether any further transmission fiber is available. In the affirmative, it is branched to step 601 and the subsequent transmission fiber is selected. If no additional fiber is available, the start-up ends (step 605).

LIST OF ABBREVIATIONS

BER bit error rate (ratio)
FDE Frequency domain equalizer
LOF loss of frame
PAR peak-to-average ratio
TDE time domain equalizer
WDM wavelength-division multiplexing

The invention claimed is:

1. A method for operating an optical network element connected to a switch, comprising:
    applying an initial set of parameters to operate the optical network element;
    receiving an optical signal at the optical network element via the switch;
    obtaining a value of a quality parameter at the optical network element, wherein the value of the quality parameter is indicative of at least one property of an optical signal or an optical path to the optical network element;
    based on the obtained value of the quality parameter and without information from the switch, deciding to apply either the initial set of parameters or a further set of parameters to operate the optical network element.

2. The method according to claim 1, wherein the quality parameter comprises at least one of the following:
    quality information with regard to an incoming signal received at the network element or after a first processing step;
    a peak-to-average ratio of a signal received at the optical network element;
    a statistic of samples received at the optical network element;
    quality information related to the eye of a signal.

3. The method according to claim 1, wherein the sets of parameters comprises at least one parameter used for at least one equalizer of the optical network element, in particular for operating a frequency domain equalizer and/or a time domain equalizer of the optical network element.

4. The method according to claim 1, wherein at least one of the sets of parameters is determined during a start-up of the optical network element.

5. The method according to claim 4,
(a) wherein the optical network element is connected to a first transmission fiber;
(b) wherein the set of parameters is optimized or adjusted for the first transmission fiber;
(c) wherein the set of parameters is stored for the first transmission fiber in order to be used as said initial set of parameters or said further set of parameters; and
(d) where the steps (a) to (c) are repeated for an additional transmission fiber as long as such additional transmission fiber is available.

6. The method according to claim 1,
(e) wherein a quality of a connection is determined via the value of the quality parameter,
(f) wherein said further set of parameters is selected if the quality of the connection is worse than a predetermined threshold,
(g) wherein the steps (e) to (f) are repeated until the quality of the connection reaches at least the predetermined threshold and/or until no further set of parameters is available.

7. The method according to claim 1, wherein information regarding a selection of the further parameter set is provided by a management system.

8. An optical network element comprising a processing unit that is configured to perform the method of claim 1.

9. The optical network element according to claim 8, comprising at least one equalizer, wherein the initial set of parameters or the further set of parameters is used to operate the at least one equalizer.

10. The optical network element according to claim 9, wherein said at least one equalizer comprises a frequency domain equalizer and/or a time domain equalizer.

11. The method according to claim 6, wherein, in step (f), said further set of parameters is selected from a plurality of sets of parameters determined during a start-up of said optical network element.

* * * * *